(12) United States Patent
Hung et al.

(10) Patent No.: US 6,690,561 B2
(45) Date of Patent: Feb. 10, 2004

(54) EFFECTIVE GATE-DRIVEN OR GATE-COUPLED ESD PROTECTION CIRCUIT

(75) Inventors: Kei-Kang Hung, Changhua Hsien (TW); Chien-Hui Chuang, Taipei Hsien (TW); Hung-Yi Chang, Hsinchu (TW)

(73) Assignee: Faraday Technology Corp., Hsinchu (TW)

( * ) Notice: Subject to any disclaimer, the term of this patent is extended or adjusted under 35 U.S.C. 154(b) by 177 days.

(21) Appl. No.: 09/990,453

(22) Filed: Nov. 20, 2001

(65) Prior Publication Data

US 2003/0043523 A1 Mar. 6, 2003

(30) Foreign Application Priority Data

Sep. 6, 2001 (TW) .................................. 90122075 A (51) Int. Cl.[7] .................................................. H02H 3/22
(52) U.S. Cl. ........................................ 361/111; 361/54
(58) Field of Search .............................. 361/103, 111, 361/54, 56, 91

(56) References Cited

U.S. PATENT DOCUMENTS 5,237,395 A * 8/1993 Lee ............................ 257/358
5,559,659 A * 9/1996 Strauss ........................ 361/56
5,617,283 A * 4/1997 Krakauer et al. ............. 361/56
5,745,323 A * 4/1998 English et al. ............... 361/56
5,825,601 A * 10/1998 Statz et al. ................... 361/56
6,043,967 A * 3/2000 Lin ............................ 361/111
6,069,782 A * 5/2000 Lien et al. ................... 361/111
6,091,593 A * 7/2000 Lin ............................ 361/111
6,522,511 B1 * 2/2003 John et al. .................... 361/56

* cited by examiner

Primary Examiner—Jonathan Salata
(74) Attorney, Agent, or Firm—J.C. Patents (57) ABSTRACT

An ESD protection circuit, arranged between a first and second potential terminals, has a RC branch, a voltage adjuster circuit, and an ESD discharge transistor. The RC branch includes a resistor and a capacitor series connected from the first to the second potential terminal. The voltage adjuster circuit has a plurality of inputs connected to the RC branch, and the first and second potential terminals, and an output connected to a gate of the ESD discharge transistor to adjust the gate voltage thereof for obtaining a uniform turn on and optimal ESD robustness. The voltage adjuster circuit mainly includes a plurality of transistors that enable to effectively adjust the gate voltage with respect to high level of ESD stress.

20 Claims, 9 Drawing Sheets

EFFECTIVE GATE-DRIVEN OR GATE-COUPLED ESD PROTECTION CIRCUIT

CROSS-REFERENCE TO RELATED APPLICATION

This application claims the priority benefit of Taiwan application serial no. 90122075, filed Sep. 6, 2001.

BACKGROUND OF THE INVENTION

1. Field of the Invention

The invention relates to an ESD protection circuit. More particularly, the invention provides an ESD protection circuit which robustness is improved.

2. Description of the Related Art

Electrostatic discharge (ESD), depending on ambient conditions including various parameters such as humidity rate, may occur whenever during the fabrication process of an integrated circuit (IC) chip or after the IC chip is achieved. When it occurs, the electrostatic discharge can irreversibly damage a part of the IC chip. To prevent ESD damages, ESD protection circuits are therefore conventionally coupled with the IC chips.

Figure 1:
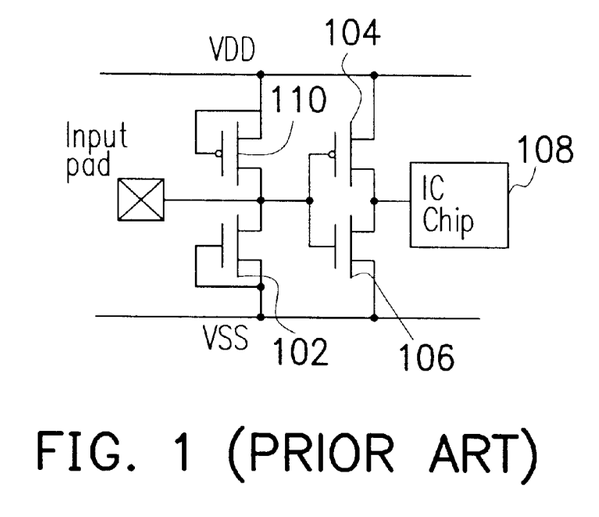
FIG. 1 and FIG. 2 are circuit diagrams that schematically illustrate conventional ESD protection circuits.

Referring to FIG. 1, a circuit diagram schematically shows an example of a conventional ESD protection circuit. As illustrated in FIG. 1, a conventional ESD protection circuit may comprise a NMOS transistor 102 and a PMOS transistor 110. The NMOS transistor 102 has its drain connected to, for example, a power supply voltage VDD, its source connected to a substrate biasing voltage VSS that can be, for example, a ground potential, and its gate connected to an input pad 112. In turn, the PMOS transistor 110 has its drain and source respectively connected to the power supply voltage VDD and the input pad 112 while its gate is connected to the power supply voltage VDD.

Furthermore, an input buffer comprising a NMOS transistor 106 and a PMOS transistor 104 is typically provided between the above ESD protection circuit and an IC chip 108.

When no electrostatic discharge occurs, both NMOS transistor 102 and PMOS transistor 110 are switched-off, and no current passes through the ESD protection circuit. The normal operation of the IC chip 108 is therefore not affected.

When an electrostatic discharge occurs, it results in an increase of the drain voltage of the NMOS transistor 102. Depending on the polarity of the electrostatic discharge, the increase of the drain voltage caused by the electrostatic discharge may exceed the breakdown voltage of either the NMOS transistor 102 or PMOS transistor 110. A resulting junction breakdown between the drain and the base (the base is typically a p-substrate (or p-well) in NMOS transistor and a n-well in PMOS transistor) triggers on the parasitic BJT, which then generates a current flow through either the NMOS transistor 102 or PMOS transistor 110. Extreme electrostatic charge can be therefore bypassed through either the NMOS transistor 102 or PMOS transistor 110, protecting thereby the IC chip 108.

As semiconductor processes emphasize on the manufacture of thinner gate oxide, the level of the gate oxide breakdown voltage is accordingly lowered. As a result, if the gate oxide breakdown voltages of the NMOS transistor 106 and PMOS transistor 104 are critically close to those junctions of the NMOS transistor 102 and PMOS transistor 110, electrostatic discharge may directly pass through and damage the gate oxide of the input buffer.

Figure 2:
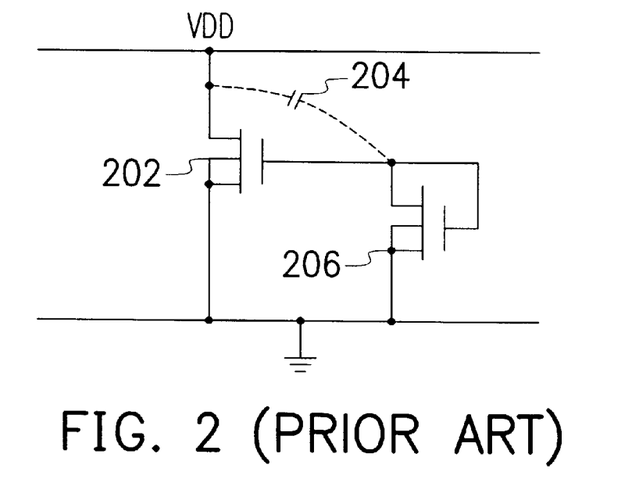

Referring to FIG. 2, a circuit diagram schematically shows a conventional gate-coupled ESD protection circuit. As illustrated in FIG. 2, the conventional ESD protection circuit comprises two NMOS transistors 202, 206. Specifically, the ESD discharge NMOS transistor 202 has its drain connected to the power supply voltage VDD, its source and its base connected to the ground, while a parasitic capacitor 204 further connects from the gate to the drain thereof. The gate of the NMOS transistor 202 further connects to both the gate and the drain of the NMOS transistor 206. Meanwhile, the source and the base of the NMOS transistor 206 are connected to the ground.

When an electrostatic discharge event occurs, the arrangement of the parasitic capacitor 204 and the NMOS transistor 206 generates a voltage at the gate of the discharge NMOS transistor 202 that can reduce its avalanche breakdown voltage, which may solve the problem of the ESD protection circuit of FIG. 1.

Figure 3:
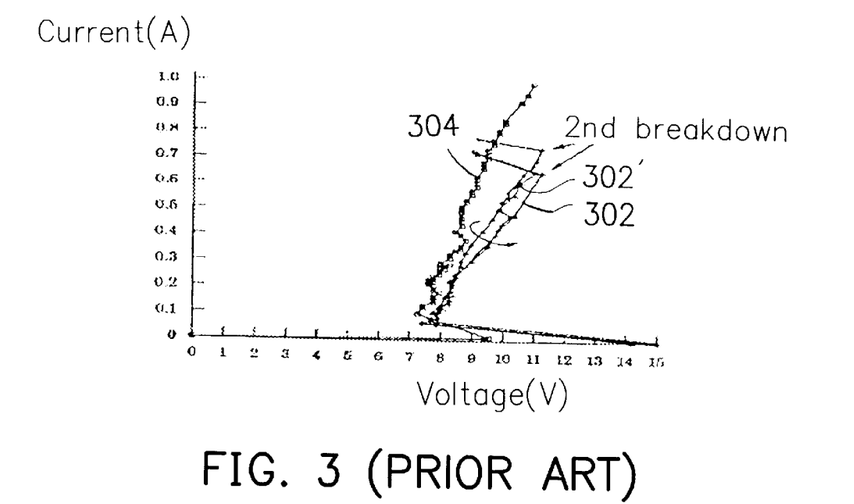
FIG. 3 is a graph that schematically plots the relationship between the ESD current and the ESD voltage for different types of ESD protection circuits.

In connection with the behavior of the above ESD protection circuits, FIG. 3 is a graph that typically plots the relationship between the ESD voltage and the ESD current of respectively a gate-grounded and gate-coupled ESD protection circuit. In FIG. 3, curves 302, 302' plot the variation of the ESD current with respect to the ESD voltage for a gate-grounded ESD protection circuit (circuit illustrated in FIG. 1). Curve 304 illustrates the variation of the ESD current with respect to the ESD voltage for a gate-coupled protection circuit (circuit illustrated in FIG. 2).

As illustrated in FIG. 3, when an electrostatic discharge event occurs, the avalanche breakdown voltage of the gate-grounded ESD protection circuit is approximately 15V while the ESD current that can be sustained does not exceed 0.8A. In contrast, the avalanche breakdown voltage of the gate-coupled ESD protection circuit is lower, being approximately 9.5V while the ESD current that can be sustained is above 1A. The robustness of the gate-coupled ESD protection circuit is therefore relatively higher than that of the gate-grounded ESD protection circuit.

Figure 4:
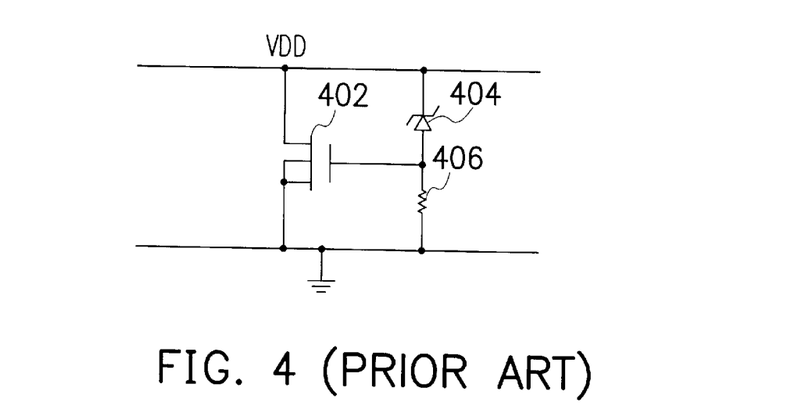
FIG. 4 is a circuit diagram that schematically illustrates another conventional ESD protection circuit.

Referring to FIG. 4, a circuit diagram schematically shows another conventional ESD protection circuit, which is a gate-driven ESD protection circuit. As shown in FIG. 4, a conventional gate-driven ESD protection circuit may comprise an ESD discharge NMOS transistor 402 that has its gate connected to a Zener diode 404 and a resistor 406. The Zener diode 404 connects from the gate of the ESD discharge transistor 402 to the power supply voltage VDD while the resistor 406 connects from the gate of the ESD discharge transistor 402 to the ground.

When an electrostatic discharge occurs, it generates a reverse breakdown of the Zener diode 404, which creates a current flow through the resistor 406. The gate voltage of the discharge NMOS transistor 402 is therefore greater than the threshold voltage of 0V, which decreases its avalanche breakdown voltage. Gate-driven ESD protection circuits and gate-coupled ESD protection circuits therefore have the same characteristics of lower avalanche breakdown voltage and better robustness.

Figure 5:
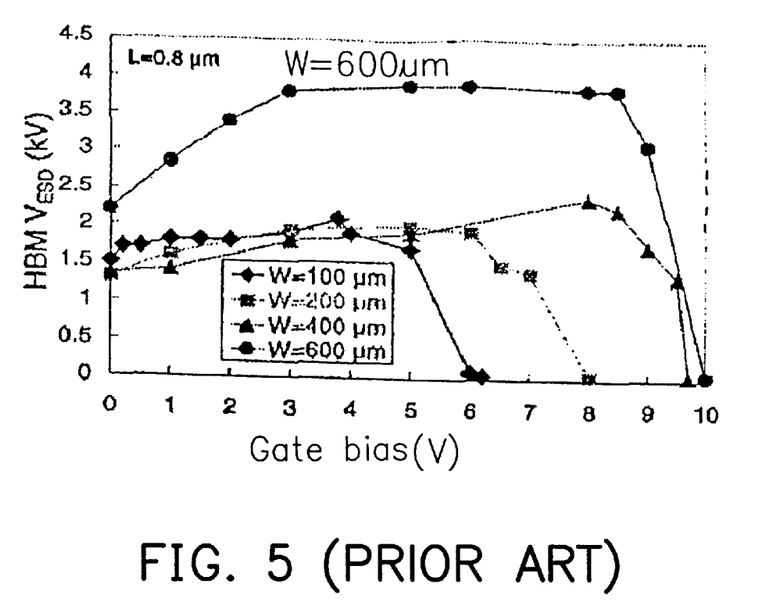
FIG. 5 is a graph that schematically represents the robustness of an ESD discharge transistor with respect to the gate voltage applied.

Referring to FIG. 5, a graph schematically plots the relationship between a human-body model (HBM) ESD voltage and the gate bias of an ESD discharge transistor for a fixed channel length L of 0.8 $\mu$m and various channel widths W. In the graph, the level of the human-body model ESD voltage depicts the robustness of the ESD discharge transistor. With respect to an ESD discharge transistor having, for example, a channel width W of 600 $\mu$m, if the gate bias is 0V when the electrostatic discharge event occurs, the ESD robustness of the discharge transistor is about 2.2 kV. If the gate bias is within a range of about 3V through 8V, the ESD robustness of the ESD discharge transistor increases to a constant level of about 3.8 kV. If the gate bias increases over 9V, the ESD robustness of the ESD discharge transistor rapidly decreases.

In the conventional protection circuits illustrated in FIG. 2 and FIG. 4, the gate bias of the discharge NMOS transistors 202, 402 is substantially depending on the electrostatic discharge that contacts with the power terminal VDD and the ground terminal. With respect to high levels of ESD stress, the gate bias is consequently increased, which results in an ESD robustness that is disadvantageously lowered. The conventional gate-driven ESD protection circuit may be therefore ineffective in this context.

SUMMARY OF THE INVENTION

An aspect of the present invention is to provide a gate-coupled or gate-driven ESD protection circuit that can discharge excessive electrostatic charge with an improved ESD robustness thereby effectively protecting a principal circuit.

To accomplish the above and other objectives, the invention provides an ESD protection circuit that is connected between two potential terminals of a principal circuit to discharge electrostatic current. The ESD protection circuit, according to an inventive concept of the invention, is arranged between a first and second potential terminal of the principal circuit, and comprises a RC branch, a voltage adjuster circuit, and an ESD discharge transistor. The RC branch includes a resistor and a capacitor that are series connected from the first potential terminal to the second potential terminal, wherein the resistor connects the capacitor via a connection node. The voltage adjuster circuit has a first input port connected to the first potential terminal, a second input port connected to the second potential terminal, and a third input connected to the connection node between the resistor and the capacitor of the RC branch. The voltage adjuster circuit further has an output that is connected to the gate of the ESD discharge transistor. The drain and the source of the ESD discharge transistor are respectively connected to the first and second potential terminal to discharge excessive electrostatic charge. In normal operating conditions of the principal circuit without occurring an electrostatic discharge even, the voltage adjuster circuit does not conduct current and the output coupled with the gate of the ESD discharge transistor turns off the ESD discharge transistor. By coupling the third input of the voltage adjuster circuit with the RC branch, the voltage adjuster circuit reacts with the occurrence of an electrostatic discharge pulse. If an electrostatic discharge pulse contacts with the first or second potential terminal, the voltage adjuster circuit accordingly becomes current conductor, and the output thereof adjusts the gate voltage of the ESD discharge transistor to obtain an uniform turn on of the ESD protection circuit for bypassing ESD current. The gate voltage of the ESD discharge transistor is adjusted to an optimal value to further obtain an optimal ESD robustness of the ESD discharge transistor. By controlling the gate bias of the ESD discharge transistor, the gate oxide thereof is not damaged when an electrostatic discharge event occurs and the turn-on speed of the ESD discharge transistor is improved.

The voltage adjuster circuit of the invention may be variously implemented. The voltage adjuster circuit principally comprises a plurality of MOS transistors that are electrically arranged with a common gate connection and a chain connection of their sources/drains from the first potential terminal to the second potential terminal. To improve the voltage adjustment of the voltage adjuster circuit, various additional voltage clamps such as diodes may be arranged in the chain connection between the first and second potential terminal and/or between the output of the voltage adjuster circuit and the second potential terminal. By using MOS transistors in the voltage adjuster circuit, the gate voltage of the ESD discharge transistor can be properly adjusted with respect to high levels of ESD stress.

According to another inventive concept of the invention, the ESD protection circuit may comprises a RC branch, a plurality of voltage adjuster circuits, and a plurality of ESD discharge transistors. The RC branch includes a resistor and a capacitor that are series connected from the first potential terminal to the second potential terminal, wherein the capacitor connects the resistor via a first connection node. The drain and the source of each ESD discharge transistor are respectively connected to the first potential terminal and the second potential terminal to discharge electrostatic charge. Each voltage adjuster circuit has a first input port connected to the first potential terminal, a second input port connected to the second potential terminal, a third input, and an output. The output of each voltage adjuster circuit is connected to the gate of one ESD discharge transistor. The voltage adjuster circuits are connected to one another via connecting the third input of one voltage adjuster circuit to the output of another voltage adjuster circuit, wherein the third input of one of the voltage adjuster circuits is further connected to the first connection node. With the above ESD protection circuit, uniform turn on and optimal ESD robustness of the ESD discharge transistors can be accomplished to effectively bypass electrostatic charge.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

The following detailed description of the embodiments and examples of the present invention with reference to the accompanying drawings is only illustrative and not limiting. Wherever possible in the following description and accompanying drawings, like reference numerals and symbols will refer to like elements and parts unless otherwise described.

Figure 10:
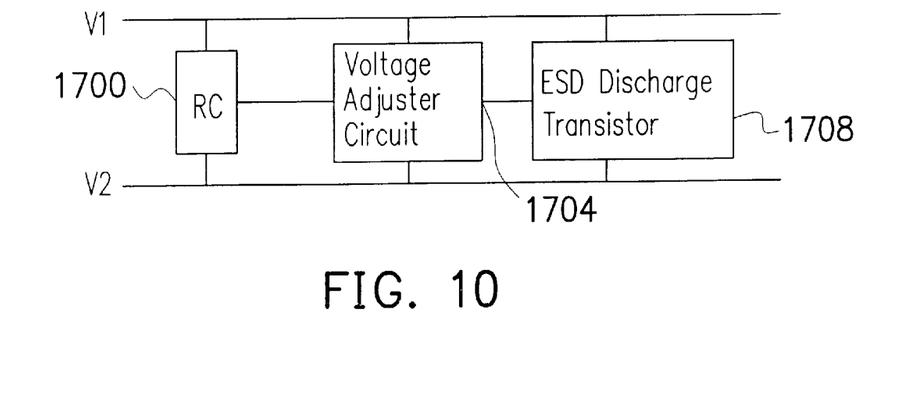
FIG. 10 is a block diagram that illustrates an ESD protection circuit according to a first inventive concept of the invention.

Referring now to FIG. 10, a block diagram schematically illustrates an ESD protection circuit according to a first inventive concept of the invention. The ESD protection circuit of the invention, arranged between a first and a second potential terminal V1, V2 of a principal circuit (not shown), principally comprise a resistor-capacitor (RC) branch 1700, an ESD discharge transistor 1708, and a voltage adjuster circuit 1704. The RC branch 1700 principally includes a capacitor and a resistor that are series connected from the first potential terminal V1 to the second potential terminal V2 (see description hereafter). The ESD discharge transistor 1708 has its drain and source respectively connected to the first potential terminal V1 and the second potential terminal V2 to discharge excessive ESD current. The voltage adjuster circuit 1704 has a first input port connected to the first potential terminal V1, a second input port connected to the second potential terminal V2, a third input connected to the RC branch 1700, and an output connected to the gate of the ESD discharge transistor 1708.

By coupling the third input of the voltage adjuster circuit part 1704 with the RC branch 1700, the voltage adjuster circuit 1704 reacts in accordance with the occurrence of an electrostatic discharge.

In normal operating conditions without occurring an electrostatic discharge even, the voltage adjuster circuit 1704 does not conduct current, and the output thereof, connected to the gate of the ESD discharge transistor 1708, turns off the ESD discharge transistor 1708.

When an electrostatic discharge pulse contacts with either the first or second potential terminal V1, V2, the voltage adjuster circuit 1704 becomes a current conductor, and the output thereof adjusts the gate voltage of the ESD discharge transistor 1708 to an optimal value corresponding to an optimal ESD robustness of the ESD discharge transistor 1708. With the gate voltage of the ESD discharge transistor 1708 hence coupled, uniform turn on of the ESD discharge transistor 1708 can be further obtained when an electrostatic discharge pulse contacts with the first or second potential terminals V1, V2.

Various embodiments and examples implementing the above inventive concept are now illustrated with reference to FIG. 6A through FIG. 7D.

Figure 6A:
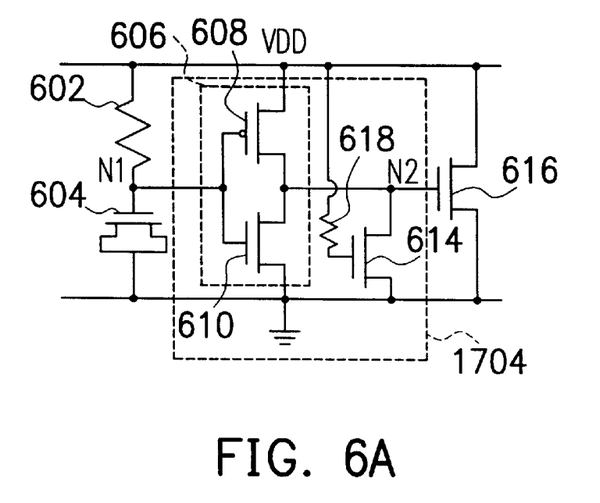
FIG. 6A through FIG. 6D are circuit diagrams that illustrate various examples of an ESD protection circuit fabricated according to a first embodiment of the invention.

Referring to FIG. 6A, a circuit diagram illustrates an ESD protection circuit fabricated according to a first embodiment of the invention. The ESD protection circuit of the invention is electrically arranged between a first potential terminal VDD and a second potential terminal. The first and second potential terminal can be, for example, a power potential terminal VDD and a reference (ground) potential terminal (they are illustrated as such in the following description). The resistor-capacitor (RC) branch 1700 (see FIG. 11) that is arranged between the power terminal VDD and a ground terminal includes a resistor 602 and a capacitor 604. The resistor 602 and capacitor 604, the capacitor 604 may have for example a typical metal-oxide-silicon (MOS) structure, are series connected from the power terminal VDD to the ground terminal, wherein the resistor 602 and capacitor 604 are connected to each other via a connection node N1.

An inverter 606, comprising for example a P-type MOS (PMOS) transistor 608 and a N-type MOS (NMOS) transistor 610, is electrically arranged between the ground terminal and the power terminal VDD. More particularly, the PMOS transistor 608 and NMOS transistor 610 have a common gate connection to the connection node N1 and a common drain connection. The source of the PMOS transistor 608 is further connected to the power terminal VDD and the source of the NMOS transistor 610 is connected to the ground terminal. The drain of the PMOS transistor 608 and the drain of the NMOS transistor 610 are further commonly connected to the drain of a NMOS transistor 614 and the gate of an ESD discharge NMOS transistor 616 via a connection node N2. The connection nodes N1, N2 respectively correspond to the input and output of the inverter 606. The NMOS transistor 614 further has its gate connected to the power terminal VDD via a resistor 618, and its source connected to the ground terminal. The ESD discharge NMOS transistor 616 further has its drain connected to the power terminal VDD and its source connected to the ground terminal. The inverter 606 and the NMOS transistor 614 compose the voltage adjuster circuit 1704 (see FIG. 11).

In normal operating conditions, the capacitor 604 is charged, and the output of the inverter 606 with both the drain voltage of the NMOS transistor 614 and the gate voltage of the NMOS transistor 616 are at low voltage of 0V. The ESD discharge NMOS transistor 616 is therefore turned off. Having a high gate voltage, the NMOS transistor 614 is turned on with a drain voltage and source voltage equal to 0V, no current consequently flows there through.

In the invention, the RC time constant of the RC branch is set within, for example, the range of 0.1 $\mu$s through 1 $\mu$s. When a turn-on of the power generates an electrical impulse, the rise-time of the impulse is typically in the order of milliseconds. The RC time constant of the RC branch should be therefore sufficient to allow for the other devices of the ESD protection circuit to be stable so that the ESD protection circuit remains in non-conducting when the electrical impulse occurs.

When an electrostatic discharge contacts with either the power terminal VDD or the ground terminal, its rise-time is typically in the order of nanoseconds, which is substantially shorter than the RC time constant of the RC branch. Moreover, the electrostatic discharge pulse generates a voltage that is higher than that of the power terminal VDD. When the electrostatic discharge event occurs, the capacitor 604 therefore cannot react on time, and the input of the inverter 606 is grounded. The PMOS transistor 608 is turned on, the NMOS transistor 610 is turned off. Within the voltage adjuster circuit 1704, both PMOS transistor 608 and NMOS transistor 614 are turned on, an ESD current thus flows there through between the power terminal VDD and the ground terminal. Both transistors 608, 614 operate as voltage clamps to adjust the gate voltage of the ESD discharge NMOS transistor 616 so that an uniform turn on and an optimal ESD robustness of the ESD discharge NMOS transistor 616 can be obtained. The maximum ESD stress level sustainable by the ESD discharge NMOS transistor 616 is therefore improved. With the use of transistors within the voltage adjuster circuit 1704, the gate voltage of the ESD discharge transistor 616 can be effectively adjusted even for high level of ESD stress.

Figure 6B:
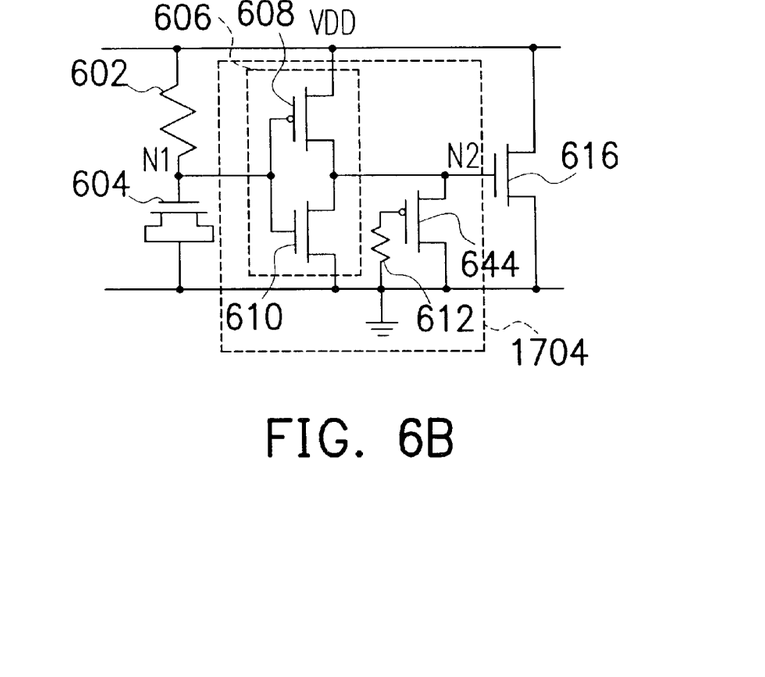
Figure 6C:
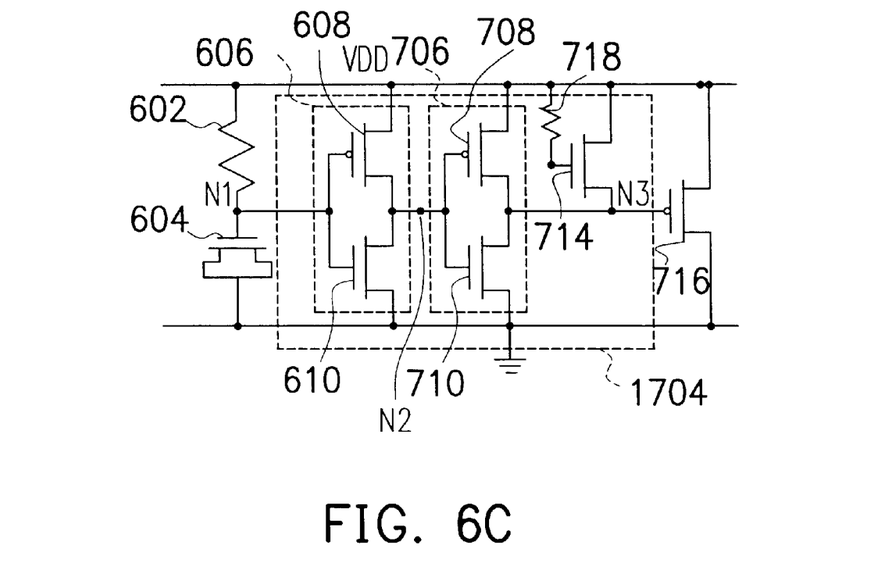
Figure 6D:
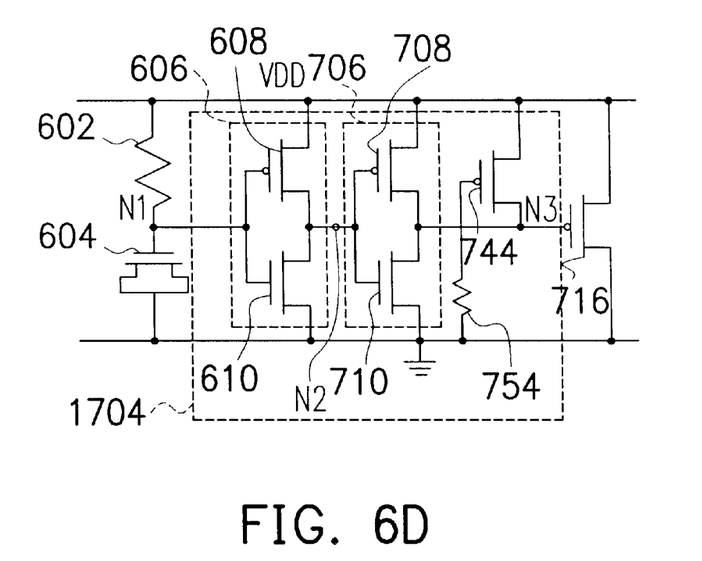

FIG. 6B through FIG. 6D are circuit diagrams that schematically illustrate variant examples of the previous embodiment of the invention. In FIG. 6B, the clamp NMOS transistor 614 (see FIG. 6A) may be replaced with, for example, a PMOS transistor 644.

In FIG. 6C, the ESD discharge NMOS-type transistor 616 may be replaced with an ESD discharge PMOS-type transistor 716. The voltage adjuster circuit 1704 of FIG. 6A should accordingly include an additional inverter 706 that may comprise, for example, a PMOS transistor 708 and a NMOS transistor 710. For the sake of simpler description, the inverter 706 is illustrated as being similar to the inverter 608. The input of the inverter 706 is further connected to the output of the inverter 606, and the output of the inverter 706 is connected to the gate of the ESD discharge PMOS transistor 716 via a connection node N3. Additionally, the clamp NMOS transistor 614 should be substituted with, for example, a clamp NMOS transistor 714 that has its gate connected to the power terminal VDD via a resistor 718, its drain connected to the power terminal VDD, and its source connected to the connection node N3. As shown in FIG. 6D, instead of the NMOS transistor 714, a PMOS transistor 744 with the gate thereof connected to the ground terminal via a resistor 754 may be used.

Similar to the ESD protection circuit of FIG. 6A, the variant structures illustrated in above FIG. 6B through FIG. 6D allow adjusting the gate voltage of the ESD discharge transistor to an optimal value so as to obtain an optimal ESD robustness and uniform turn on.

Figure 7A:
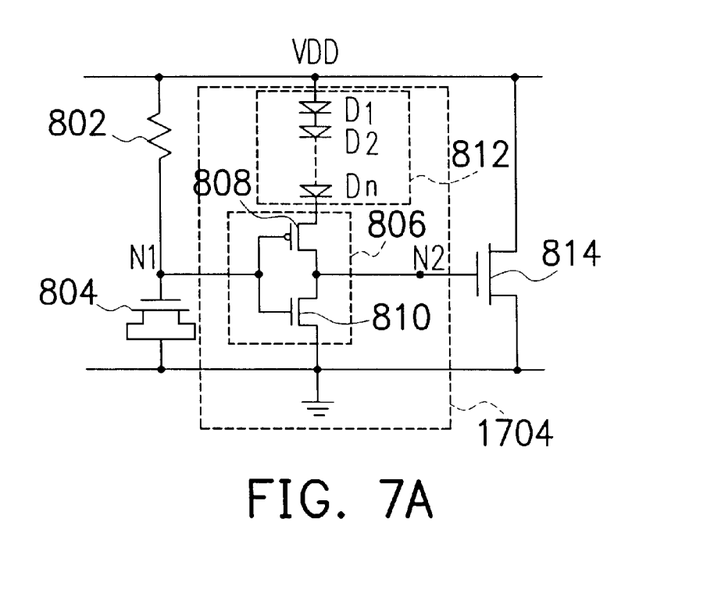
FIG. 7A through FIG. 7D are circuit diagrams that illustrate various examples of an ESD protection circuit fabricated according to a second embodiment of the present invention.

Referring now to FIG. 7A, a circuit diagram schematically illustrates an ESD protection circuit fabricated according to a second embodiment of the invention. As illustrated in FIG. 7A, the ESD protection circuit, similar to the previous embodiment, comprises a RC branch that includes a resistor 802 and a capacitor 804 arranged between the power terminal VDD and the ground terminal. N1 identically refers to the connection node between the resistor 802 and the capacitor 804. A set of diodes 812, including a plurality of diodes (D1, D2, . . . , Dn) that are series arranged, has the anode thereof connected to the power terminal VDD.

An inverter 806 comprising, for example, a PMOS transistor 808 and a NMOS transistor 810, is further arranged between the cathode of the set of diodes 812 and the ground terminal. Within the inverter 806, a PMOS transistor 808 and a NMOS transistor 810 are connected to each other respectively via a common gate connection to the connection node N1. The drain of the PMOS transistor 808 is further connected to the cathode of the set of diodes 812, the source of the NMOS transistor 810 is connected to the ground terminal, and the source of the PMOS transistor 808 and the drain of the NMOS transistor 810 are connected to each other. The common connection between the PMOS transistor 808 and NMOS transistor 810 is further commonly connected to the gate of an ESD discharge NMOS transistor 814 via a connection node N2. The connection node N1 corresponds to the input of the inverter 806 and the connection node N2 to the output of the inverter 806. The source and drain of the ESD discharge NMOS transistor 814 further connect from the ground and the power terminal VDD to shunt ESD current. The inverter 806 and the set of diodes 812 compose the voltage adjuster circuit 1704 in this example of the invention.

In normal operating conditions, the capacitor 804 is charged and the output of the inverter 806 to which is connected the gate of the ESD discharge NMOS transistor 814 is at 0V. The ESD discharge NMOS transistor 814 is therefore turned off and the voltage adjuster circuit 1704 does not conduct current.

When an electrostatic discharge pulse contacts with either the power or ground terminal, the input of the inverter 806 is grounded, the PMOS transistor 808 is turned on, the NMOS transistor 810 is turned off, and the NMOS transistor 814 is turned on. Within the voltage adjuster circuit 1704, the set of diodes 812 and the PMOS transistor 808 can thereby adjust the gate voltage of the ESD discharge NMOS transistor 814 to obtain a uniform turn on and an optimal ESD robustness of the ESD discharge NMOS transistor 814.

Figure 7B:
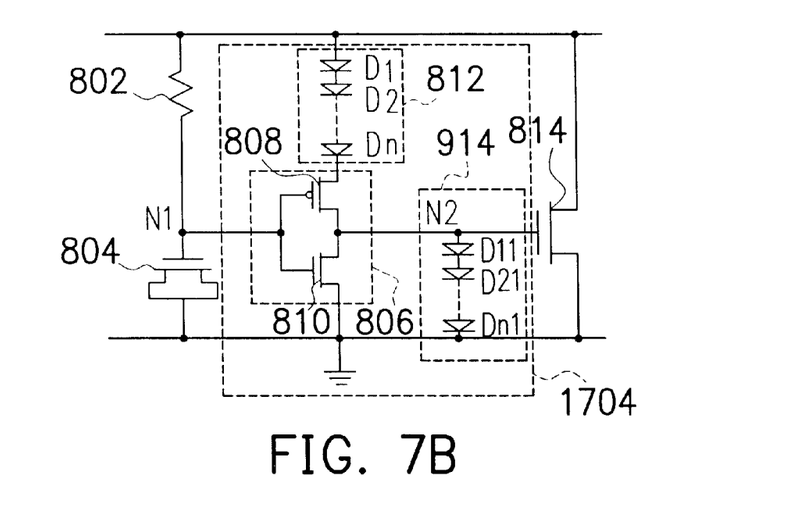

FIG. 7B is a circuit diagram that schematically illustrates a variant example of the ESD protection circuit of FIG. 7A. As illustrated in FIG. 7B, an additional set of diodes 914 may be arranged between the connection node N2 and the ground terminal to improve the gate voltage adjustment of the ESD discharge NMOS transistor 814. The set of diodes 914 is arranged such that the anode thereof is connected to the connection node N2 and the cathode thereof is connected to the ground terminal. The set of diodes 914 provides a ESD current bypass within the voltage adjuster circuit 1704 and, with the set of diodes 1012 and the PMOS transistor 1008, adjust the gate voltage of the ESD discharge NMOS transistor 816 to obtain an optimal ESD robustness.

Figure 7C:
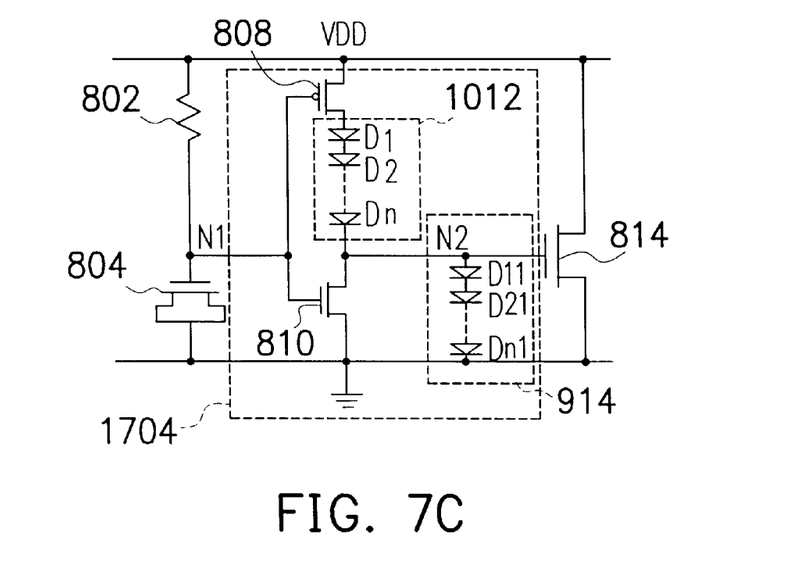
Figure 7D:
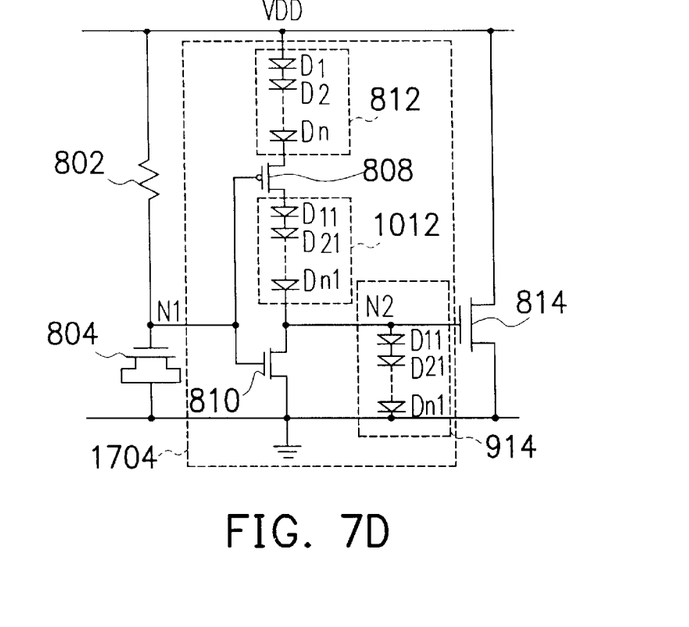

FIG. 7C and FIG. 7D show various variant structures of the ESD protection circuit of FIG. 7A and FIG. 7B. As shown in FIG. 7C and FIG. 7D, a set of diodes 1012, connecting from the source of the PMOS transistor 808 to the connection node N2, may either substitute for or be added to the set of diodes 812 to properly adjust the gate voltage of the ESD discharge transistor 814.

Figure 11:
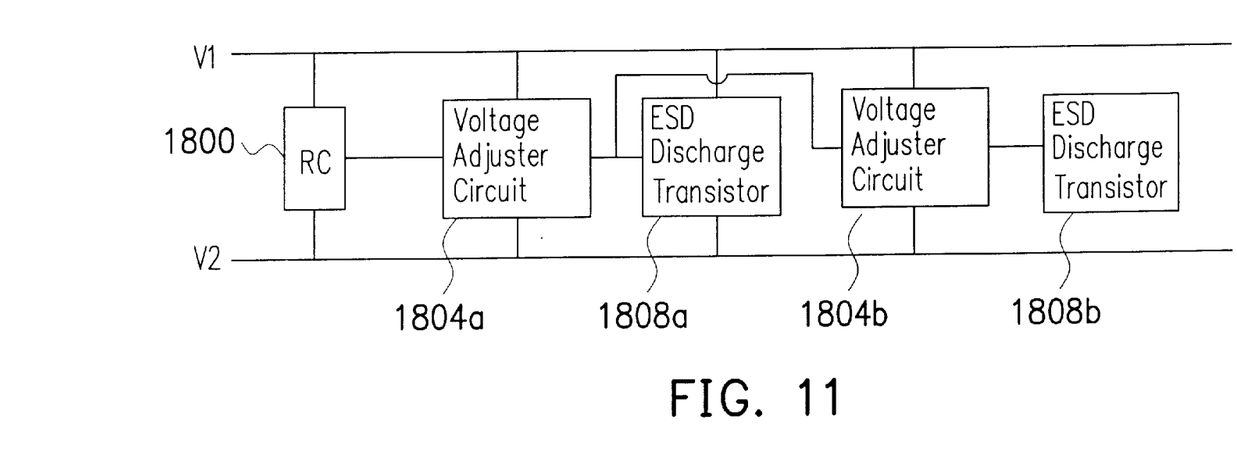
FIG. 11 is a block diagram that illustrates an ESD protection circuit according to a second inventive concept the present invention.

Referring now to FIG. 11, a block diagram schematically illustrates an ESD protection circuit according to a second inventive concept of the invention. The ESD protection circuit comprises a RC branch 1800, a plurality of voltage adjuster circuits (1804a, 1804b), and a plurality of ESD discharge transistors (1808a, 1808b). The RC branch 1800 includes a resistor and a capacitor that series connect from the first potential terminal V1 to the second potential terminal V2 similar to the above embodiments and examples.

Each ESD discharge transistor (1808a, 1808b) has the drain thereof connected to the first potential terminal V1 and the source thereof connected to the second potential terminal V2. Each voltage adjuster circuit (1804a, 1804b) further has a first input port connected to the first potential terminal, a second input port connected to the second potential terminal, a third input, and an output connected to the gate of one ESD discharge transistor. The voltage adjuster circuits (1804a, 1804b) are connected to one another via connecting the third input of one voltage adjuster circuit to the output of another voltage adjuster circuit, wherein the third input of one of the voltage adjuster circuits further connects the RC branch 1800.

With the above ESD protection circuit, excessive electrostatic charges can be effectively shunted through the ESD discharge transistors (1808a, 1808b) which each respective ESD robustness is improved by a proper gate voltage adjustment. The voltage adjuster circuits (1804a, 1804b) enable to adjust the gate voltage of each of the ESD discharge transistors (1808a, 1808b) so that optimal ESD robustness and uniform turn on thereof can be favorably obtained. An example of implementation of the above ESD protection circuit is described hereafter with reference to FIG. 8.

Figure 8:
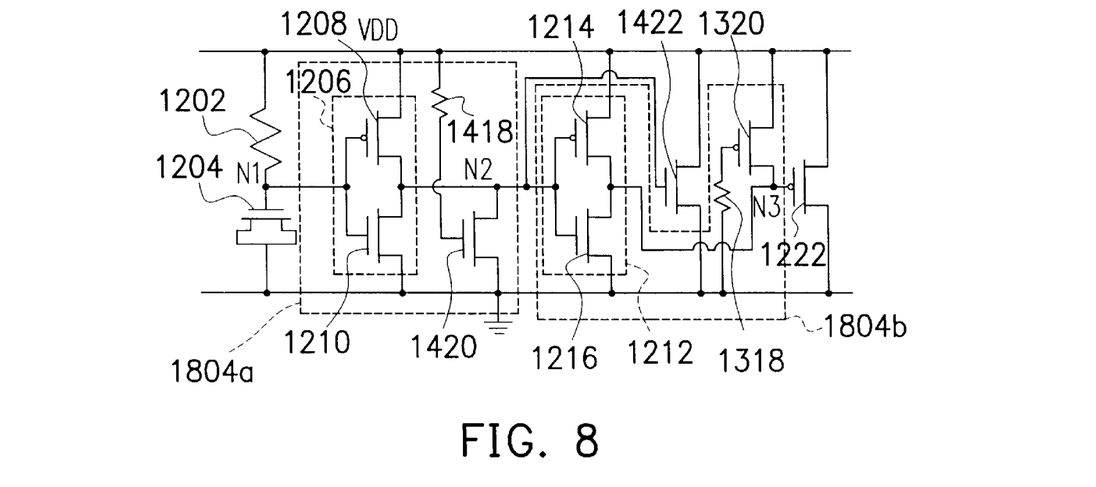
FIG. 8 is a circuit diagram that illustrate an example of an ESD protection circuit fabricated according to a third embodiment of the present invention.

Referring to FIG. 8, a circuit diagram schematically illustrates an ESD protection circuit fabricated according to a third embodiment of the invention. The RC branch includes a resistor 1202 and a capacitor 1204 that are series connected from the power terminal VDD to the ground terminal, wherein the resistor 1202 is connected to the capacitor 1204 via a connection node N1. A first voltage adjuster circuit 1804a may include, for example, an inverter 1206 and a NMOS transistor 1420, similarly to the example illustrated in FIG. 6A. The output of the first voltage adjuster circuit 1804a is connected to the gate of a first ESD discharge NMOS transistor 1422 which drain and source are respectively connected to the power and ground terminals.

A second voltage adjuster circuit 1804b may include, for example, an inverter 1212 and a PMOS transistor 1320, similarly to the first voltage adjuster circuit 1804a. The PMOS transistor 1320 has its drain connected to the power terminal, its source connected to the output of the inverter 1212 via a connection node N3, and its gate connected to the ground terminal via a resistor 1318. The connection node N3, corresponding to the output of the second voltage adjuster circuit 1804b, is further connected to the gate of a second ESD discharge PMOS transistor 1222.

With the above ESD protection circuit, when an electrostatic discharge pulse contacts with either the power or ground terminal, the PMOS transistor 1208 and NMOS transistor 1420 of the first voltage adjuster circuit 1804a are turned on. An ESD current can be bypassed there through and the gate voltage of the ESD discharge NMOS transistor 1422 can be adjusted to a value corresponding to an optimal ESD robustness thereof. Meanwhile, the NMOS transistor 1216 and the PMOS transistor 1320 of the second voltage adjuster circuit 1804b are turned on. An ESD current can be bypassed there through and the gate voltage of the ESD discharge NMOS transistor 1222 can be adjusted to a value corresponding to an optimal ESD robustness thereof.

With the above ESD protection circuit, the ESD discharge transistors 1422, 1222 can mainly discharge ESD current with improved ESD robustness and uniform turn on.

Figure 9A:
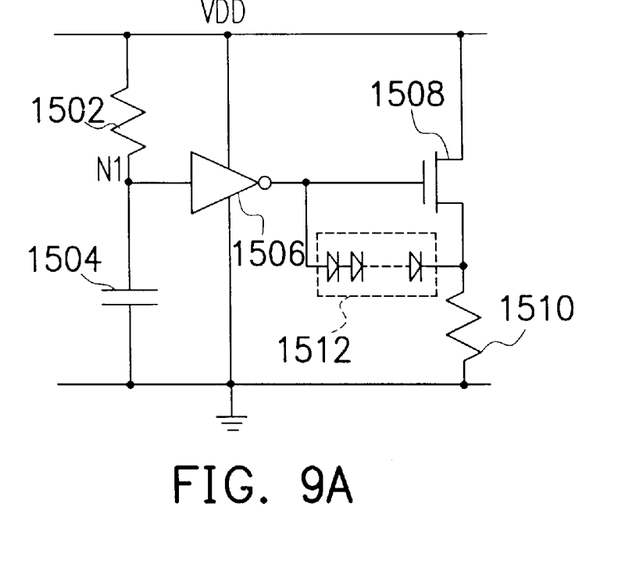
FIG. 9A and FIG. 9B are circuit diagrams that illustrate various examples of an ESD protection circuit fabricated according to a fourth embodiment of the present invention.

Referring to FIG. 9A, a circuit diagram schematically illustrates an ESD protection circuit according to a fourth embodiment of the invention. The ESD protection circuit comprises an ESD discharge NMOS transistor 1508, and a RC branch including a resistor 1502 and a capacitor 1504 that electrically arranged between the power terminal VDD and the ground terminal. To adjust the gate voltage of the ESD discharge NMOS transistor 1508, a resistor 1510 connects the source of the ESD discharge NMOS transistor 1508 to the ground terminal, and a set of diodes 1512 connects the gate to the source. The gate of the ESD discharge NMOS transistor 1508 is further connected to the output of an inverter 1506. The inverter 1506 has a first input connected to the power terminal VDD, a second input connected to the ground terminal, and a third input connected to the connection node N1 between the resistor 1502 and the capacitor 1504.

In normal operating conditions, the input of the inverter 1506 is at a charging voltage of the capacitor 1504. The inverter 1506 is configured in such a manner that the output thereof is accordingly at a low voltage which turns off the discharge NMOS transistor 1508.

When an electrostatic discharge pulse contacts with either the power or ground terminal, the input of the inverter 806 is grounded (low voltage), and the output of the inverter 806 is at high voltage. With the set of diodes 1512 and resistor 1510 operating as voltage clamps, the gate voltage of the ESD discharge NMOS transistor 1508 can be adjusted to obtain a uniform turn on and an optimal ESD robustness thereof.

Figure 9B:
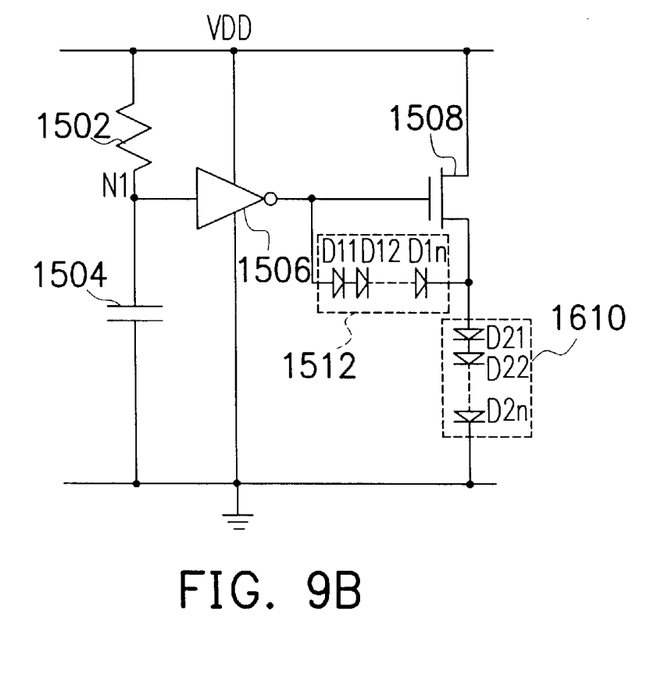

As shown in FIG. 9B, the resistor 1510 may be readily substituted with a set of diodes 1610 to obtain a favorable gate voltage adjustment.

In conclusion, the invention provides an ESD protection circuit that can bypass ESD current with optimal ESD robustness and uniform turn on of the ESD discharge transistor. The above advantages can be achieved via coupling the gate of the ESD discharge transistor to the output of a voltage adjuster circuit that properly adjusts the gate voltage of the ESD discharge transistor. By constructing the voltage adjuster circuit with voltage clamps that include transistors, the gate voltage of the ESD discharge transistor can be properly adjusted with respect to high levels of ESD stress that may contact the potential terminals.

It should be apparent to those skilled in the art that other circuit structures obtained from various modifications and variations of the structures of the present invention would be possible without departing from the scope and spirit of the invention as defined in the following claims.

What is claimed is:

1. A gate-driven or gate-coupling electrostatic discharge (ESD) protection circuit, wherein the ESD protection circuit is arranged between a first potential terminal and a second potential terminal of a principal circuit to bypass ESD current, the ESD protection circuit comprising:

a first resistor and a capacitor, the first resistor and the capacitor are series connected between the first potential terminal and the second potential terminal, wherein the first resistor and the capacitor we connected to each other via a first connection node;

at least an inverter, wherein the inverter has a first input connected to the first potential terminal, a second input connected to the second potential terminal, a third input connected to the first connection node, and an output;

a voltage clamping transistor having a first source, a first drain, and a first gate, wherein the first drain and the first source respectively connect from the output of the inverter to either the first or second potential terminal, and the first gate is connected to either the first or second potential terminal via a second resistor; and an ESD discharge transistor having a second source, a second drain, and a second gate, wherein the second drain and the second source respectively connect from the first potential terminal to the second potential terminal to discharge ESD current, and the second gate is connected to the output of the inverter and to the first drain of the voltage clamping transistor, whereby the voltage of the second gate is adjusted by means of the inverter and the voltage clamping transistor to obtain an optimal ESD robustness and an uniform turn on of the ESD discharge transistor.

2. The ESD protection circuit of claim 1, wherein the inverter further comprises:

a first NMOS transistor having a third source, a third drain, and a third gate, wherein the third gate is connected to the first connection node, the third source is connected to the second potential terminal, and the third drain is respectively connected to the first drain of the voltage clamping transistor and the second gate of the ESD discharge transistor; and a first PMOS transistor having a fourth source, a fourth drain, and a fourth gate, wherein the fourth gate is connected to the third gate of the first NMOS transistor and to the first connection node, the fourth drain is connected to the first potential terminal, and the fourth source is connected to the third drain of the first NMOS transistor.

3. The ESD protection circuit of claim 1, wherein the voltage clamping transistor includes either a PMOS transistor or a NMOS transistor.

4. The ESD protection circuit of claim 1, wherein the capacitor further includes a MOS structure.

5. The ESD protection circuit of claim 1, wherein the ESD discharge transistor includes a PMOS transistor or a NMOS transistor.

6. A gate-driven or gate-coupling electrostatic discharge (ESD) protection circuit, wherein the ESD protection circuit is arranged between a first potential terminal and a second potential terminal of a principal circuit to bypass ESD current, the ESD protection circuit comprising:

a first resistor and a capacitor, the first resistor and the capacitor are series connected between the first potential terminal and the second potential terminal, wherein the first resistor and the capacitor are connected to each other via a first connection node;

an ESD discharge transistor having a first source, a first drain, and a first gate, wherein the first drain and the first source respectively connect from the first potential terminal to the second potential terminal to shunt ESD current;

a first NMOS transistor having a second source, a second drain, and a second gate; and a first PMOS transistor having a third source, a third drain, and a third gate, wherein the second gate and the third gate are respectively connected to each other and to the first connection node, and the second source, the second drain, the third source, and the third drain are connected in a connection chain from the first potential terminal to the second potential terminal, wherein the second source and the second drain are connected to each other and to the first gate of the ESD discharge transistor; and at least a set of diodes, wherein the set of diodes is electrically placed in the connection chain so that the first PMOS transistor and the set of diodes can adjust the voltage of the first gate of the ESD discharge transistor to obtain an optimal ESD robustness and an uniform turn on of the ESD discharge transistor.

7. The ESD protection circuit of claim 6, wherein an additional set of diodes is electrically arranged between the first gate of the ESD discharge transistor and either the first or second potential terminal.

8. The ESD protection circuit of claim 6, wherein the capacitor includes a MOS structure.

9. A gate-driven or gate-coupling electrostatic discharge (ESD) protection circuit, wherein the ESD protection circuit is arranged between a first potential terminal and a second potential terminal of a principal circuit to bypass ESD current, the ESD protection circuit comprising:

a first resistor and a capacitor, the first resistor and the capacitor are series connected between the first potential terminal and the second potential terminal, wherein the first resistor and the capacitor are connected to each other via a first connection node;

an ESD discharge transistor having a source, a drain, and a gate, wherein the drain is connected to the first potential terminal and the source is connected to the second potential terminal to discharge ESD current; and a voltage adjuster circuit, the voltage adjuster circuit has a first input port connected to the first potential terminal, a second input port connected to the second potential terminal, a third input connected to the first connection node, and an output connected to the gate of the ESD discharge transistor, wherein the voltage adjuster circuit includes a plurality of transistors electrically arranged to respectively turn off the ESD discharge transistor when no electrostatic discharge contacts with either the first or second potential terminal, and adjust the gate voltage of the ESD discharge transistor to obtain a uniform turn on and an optimal ESD robustness of the ESD discharge transistor when an electrostatic discharge contacts with the first or second potential terminal, wherein the voltage adjuster circuit also comprises a MOS transistor having a source electrode and a drain electrode counted between the gate of the ESD discharge transistor and one of the first and second potential terminals, wherein a gate electrode of the MOS transistor is coupled to one of the first and second potential terminals via a resistor.

10. The ESD protection circuit of claim 9, wherein the voltage adjuster circuit includes a plurality of NMOS and PMOS transistors that are electrically arranged in inverter configuration.

11. The ESD protection circuit of claim 9, wherein the voltage adjuster circuit includes at least a set of diodes.

12. A gate-driven or gate-coupling electrostatic discharge (ESD) protection circuit, wherein the ESD protection circuit is arranged between a first potential terminal and a second potential terminal of a principal circuit to bypass ESD current, the ESD protection circuit comprising:

a first resistor and a capacitor, the first resistor and the capacitor are series connected between the first potential terminal and the second potential terminal, wherein the first resistor and the capacitor are connected to each other via a first connection node;

a plurality of ESD discharge transistors, wherein each ESD discharge transistor has a first drain connected to the first potential terminal, a first source connected to the second potential terminal, and a first gate;

a plurality of inverters, wherein each inverter has a first input connected to the first potential terminal, a second input connected to the second potential terminal, a third input, and an output connected to the first gate of one ESD discharge transistor, the inverters are connected to one another via connecting the output of one inverter to the third input of another inverter, wherein the third input of one of the inverters is further connected to the first connection node; and a plurality of voltage clamping transistors, wherein each voltage clamping transistor has a second drain connected to the first gate of one ESD discharge transistor, a second source connected to either the first or second potential terminal, and a second gate connected to either the first or second potential terminal via a second resistor, so that each voltage clamping transistor and each inverter can adjust the voltage of the first gate of one ESD discharge transistor to obtain an uniform turn and an optimal ESD robustness of the ESD discharge transistor.

13. The ESD protection circuit of claim 12, wherein the voltage clamping transistors include PMOS and NMOS transistors.

14. The ESD protection circuit of claim 12, wherein the ESD discharge transistors includes NMOS transistors or PMOS transistors.

15. The ESD protection circuit of claim 12, wherein each inverter further comprises:
- a first NMOS transistor having a third source, a third drain, and a third gate, wherein the third gate is connected to either the first connection node or the output of another inverter, the third source is connected to the second potential terminal, and the third drain is respectively connected to the second drain of one voltage clamping transistor and the first gate of one ESD discharge transistor; and
- a first PMOS transistor having a fourth source, a fourth drain, and a fourth gate, wherein the fourth gate is connected to the third gate of the NMOS transistor, the fourth drain is connected to the first potential terminal, and the fourth source is connected to the third drain of the first NMOS transistor.

16. A gate-driven or gate-coupling electrostatic discharge (ESD) protection circuit, wherein the ESD protection circuit is arranged between a first potential terminal and a second potential terminal of a principal circuit to bypass ESD current, the ESD protection circuit comprising:
- a first resistor and a capacitor, the first resistor and the capacitor are series connected between the first potential terminal and the second potential terminal, wherein the first resistor and the capacitor are connected to each other via a first connection node;
- a plurality of ESD discharge transistors, wherein each ESD discharge transistor has a drain connected to the first potential terminal, a source connected to the second potential terminal, and a gate; and
- a plurality of voltage adjuster circuits, each voltage adjuster circuit has a first input port connected to the first potential terminal, a second input port connected to the second potential terminal, a third input, and an output connected to the gate of one ESD discharge transistor, the voltage adjuster circuits are connected to one another via connecting the third input of one voltage adjuster circuit to the output of another voltage adjuster circuit, wherein the third input of one of the voltage adjuster circuits is further connected to the first connection node, each voltage adjuster circuit further includes a plurality of transistors electrically arranged to adjust the gate voltage of the ESD discharge transistor for obtaining a uniform turn on and an optimal ESD robustness of the ESD discharge transistors when an electrostatic discharge contacts with the first or second potential terminal, wherein each of the voltage adjuster circuits also comprises a MOS transistor having a source electrode and a drain electrode coupled between the gate of the ESD discharge transistor and one of the first and second potential terminals, wherein a gate electrode of the MOS transistor is coupled to one of the first and second potential terminals via a resistor.

17. The ESD protection circuit of claim 16, wherein each voltage adjuster circuit includes a plurality of NMOS and PMOS transistors that are electrically arranged in inverter configuration.

18. A gate-driven or gate-coupling electrostatic discharge (ESD) protection circuit, wherein the ESD protection circuit is arranged between a first potential terminal and a second potential terminal of a principal circuit to bypass ESD current, the ESD protection circuit comprising:
- a first resistor and a capacitor, the first resistor and the capacitor are series connected between the first potential terminal and the second potential terminal, wherein the first resistor and the capacitor are connected to each other via a first connection node;
- an ESD discharge transistor, wherein the ESD discharge transistor has a drain connected to the first potential terminal, a source connected to the second potential terminal via a first voltage clamp, and a gate connected to the source via a second voltage clamp; and
- an inverter, wherein the inverter has a first input port connected to the first potential terminal, a second input port connected to the second potential terminal, a third input connected to the first connection node, and an output connected to the gate of the ESD discharge transistor, so that the inverter and the first and second voltage clamps can adjust the gate voltage of the ESD discharge transistor to obtain an uniform turn on and optimal ESD robustness of the ESD discharge transistor.

19. The ESD protection circuit of claim 18, wherein the first voltage clamp includes a resistor or a set of diodes.

20. The ESD protection circuit of claim 18, wherein the second voltage clamp includes a set of diodes.

* * * * *